Oct. 25, 1938. H. W. BARTHOLOMEW Re. 20,893

MILLING MACHINE

Original Filed May 27, 1935 4 Sheets-Sheet 1

Inventor
Howard W. Bartholomew
Owen & Owen
By
Attorneys

Oct. 25, 1938. H. W. BARTHOLOMEW Re. 20,893

MILLING MACHINE

Original Filed May 27, 1935 4 Sheets-Sheet 2

Inventor
Howard W. Bartholomew
Owen & Owen
By
Attorneys

Oct. 25, 1938. H. W. BARTHOLOMEW Re. 20,893
MILLING MACHINE
Original Filed May 27, 1935 4 Sheets-Sheet 3
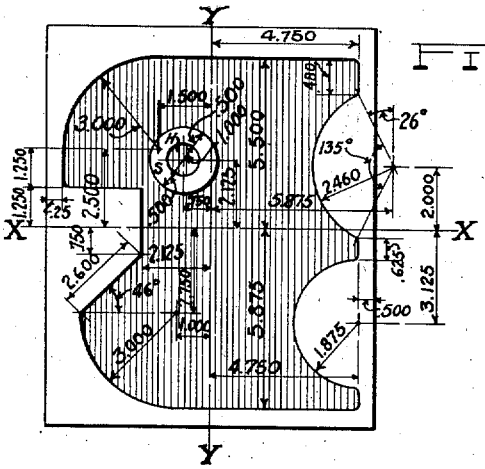
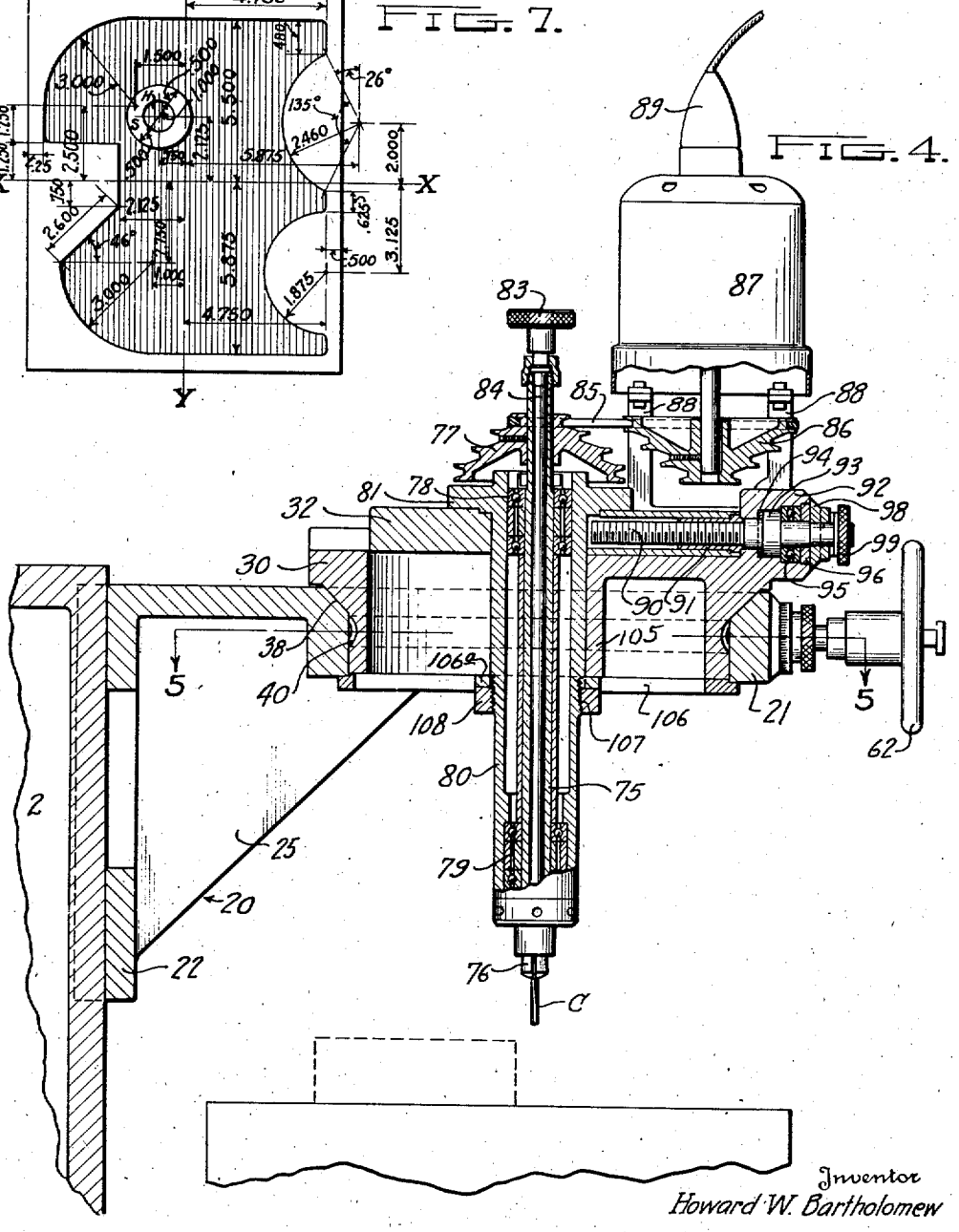
Inventor
Howard W. Bartholomew
Owen & Owen
By
Attorneys Oct. 25, 1938. H. W. BARTHOLOMEW Re. 20,893

MILLING MACHINE

Original Filed May 27, 1935 4 Sheets-Sheet 4

Inventor
Howard W. Bartholomew

Owen & Owen

By

Attorneys

Reissued Oct. 25, 1938

Re. 20,893

UNITED STATES PATENT OFFICE 20,893

MILLING MACHINE

Howard W. Bartholomew, Pottstown, Pa., assignor to Doehler Die Casting Company, Toledo, Ohio, a corporation of New York Original No. 2,069,299, dated February 2, 1937, Serial No. 23,562, May 27, 1935. Application for reissue September 21, 1937, Serial No. 164,883

17 Claims. (Cl. 90—15)

This invention relates to milling and boring machines, and is more particularly directed to a universal attachment for such a machine.

It has heretofore been proposed to provide attachments for vertical spindle milling machines, which reduce the number of set-up operations required in the formation of a die block. Such attachments have taken the form of a circular table for the machine having cross feeds built therein below the die holding surface so that the work may be moved to a designated center and then swung about this center to cut on an arc. In every instance these devices have been so constructed as to require rotation of the work for such a cut, and thus are attended by the disadvantage that the throat of the machine must be unusually deep to accommodate work of any great size.

It has also been proposed to provide a vertical spindle which is carried by cross slides in such a manner as to be movable to a given center above the work. Such a device is of limited utility, even when used with a circular table, as it is impossible to cut on an arc having a center other than that of the circular table on which the work is carried.

The present invention has for its primary object the provision of means to move a vertical spindle of a milling machine in a circular path of any designated radius.

Another object of the invention is the provision of means which will enable the operator of the machine to cut any desired shape, so long as he is given the radius of all circular cuts and the coordinates of the centers, without removing the work for resetting.

Another object of the invention is the provision of a device of this character, which is sturdy in its construction, simple and efficient of operation and which may be either built into a milling machine or made an attachment to an existing machine at a relatively low cost.

Other objects and advantages of the invention will become apparent as the description proceeds, reference being had to the accompanying drawings, in which—

Fig. 4 is a central vertical section of the attachment taken on line 4—4 of Fig. 2;

Fig. 7 is a plan view of an arbitrary sample of work cut by the machine.

Figure 1:
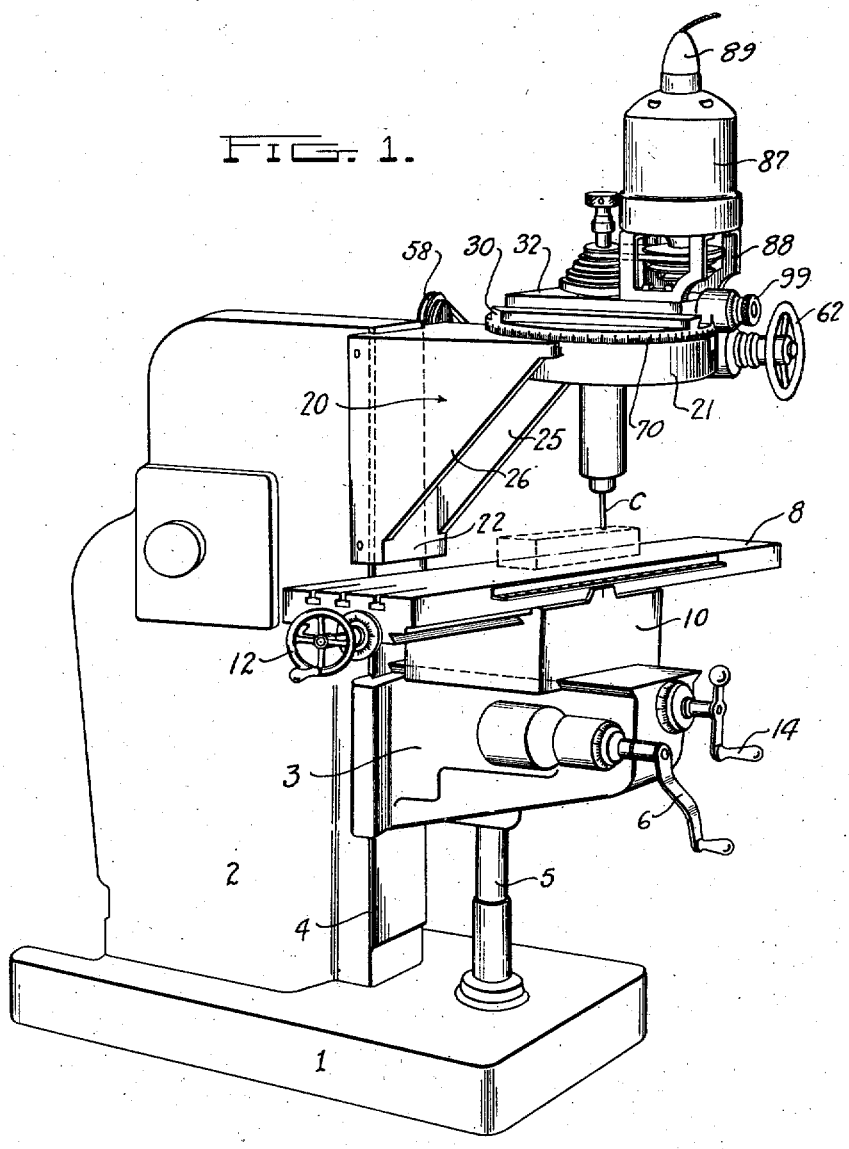
Figure 1 is a diagrammatic perspective view of a milling machine equipped with an attachment constructed in accordance with the present invention.

In the embodiment shown, the invention is carried as an attachment to a milling machine having a base 1 and an upright frame part 2. A knee 3 is vertically adjustable on the frame, being guided in undercut grooves 4 and moved by a vertically telescoping post support 5. The vertical adjustment is made by a hand crank 6 in the usual manner.

A work table 8 is mounted for longitudinal sliding movements transversely of the frame on a saddle 10, the movement being effected by a longitudinal-feed screw controlled by a handwheel 12. The saddle 10 is, in turn, mounted for cross movements, that is, inward and outward movements, relative to the knee 3, the cross feed being controlled by a hand crank 14. It will thus be seen that the table 8 on which the work is carried is movable in rectilinear paths by the longitudinal feed 12 and the cross feed 14. Vertical movements of the table are made by the vertical feed 6. It will be appreciated that all of these feeds are preferably precision screw feeds, and that they may be mechanized by connecting them to a motor carried within the frame 2 in any suitable manner, as well understood in the art. The extent of movement, or position of each of the feeds, is determinable at any time by vernier or micrometer scales previously fixed to the machine and properly calibrated. These scales form a part of all conventional feeds, and are, therefore, not described in detail. It will be understood that the parts so far described are well known and constitute equipment generally associated with machines of this kind.

The spindle controlling attachment to which the present invention is particularly directed is carried by the upright machine frame 2, in the present instance by an inverted L-shaped supporting frame 20 having a forwardly extending horizontal portion 21 and a vertical leg 22. Adjustable clamping gibs 24 are carried on each side of the vertical leg 22 and are adapted to engage in the under-cut grooves 4 to hold the attachment in adjusted position relative to the frame 2. Bracing webs 25 and 26 connect the horizontal and vertical frame parts to supply rigidity to the construction. It will be appreciated that any suitable frame may be provided to hold the attachment in a constant horizontal plane above the work, and that, in the present instance, such position may be readily changed by adjusting the clamping gibs 24.

The milling attachment itself comprises a rotatable head 30, mounted for rotation in the frame 20, and having a cross slide 32 mounted therein and a cutter spindle carried by said slide. The details of construction, drive and relationship of the parts will be presently described.

Figure 3:
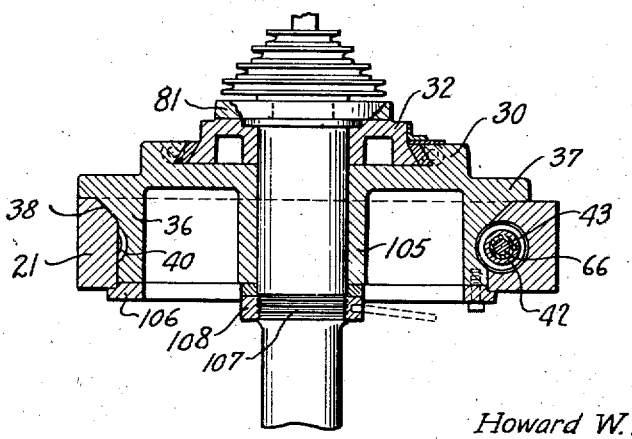
Fig. 3 is a fragmentary section on line 3—3 of Fig. 2 with parts in full.

As shown in Fig. 3, the rotatable head 30 is constructed to include a vertical part 36 received in a forwardly disposed circular opening in the horizontal frame part 21. An outwardly extending flange 37 is provided on the periphery of the head 30 and is adapted to overlie the upper surface of the frame, and is connected with the vertical part 36 by an annular bearing surface 38 cooperating with a similar surface formed in the frame 21.

Figure 5:
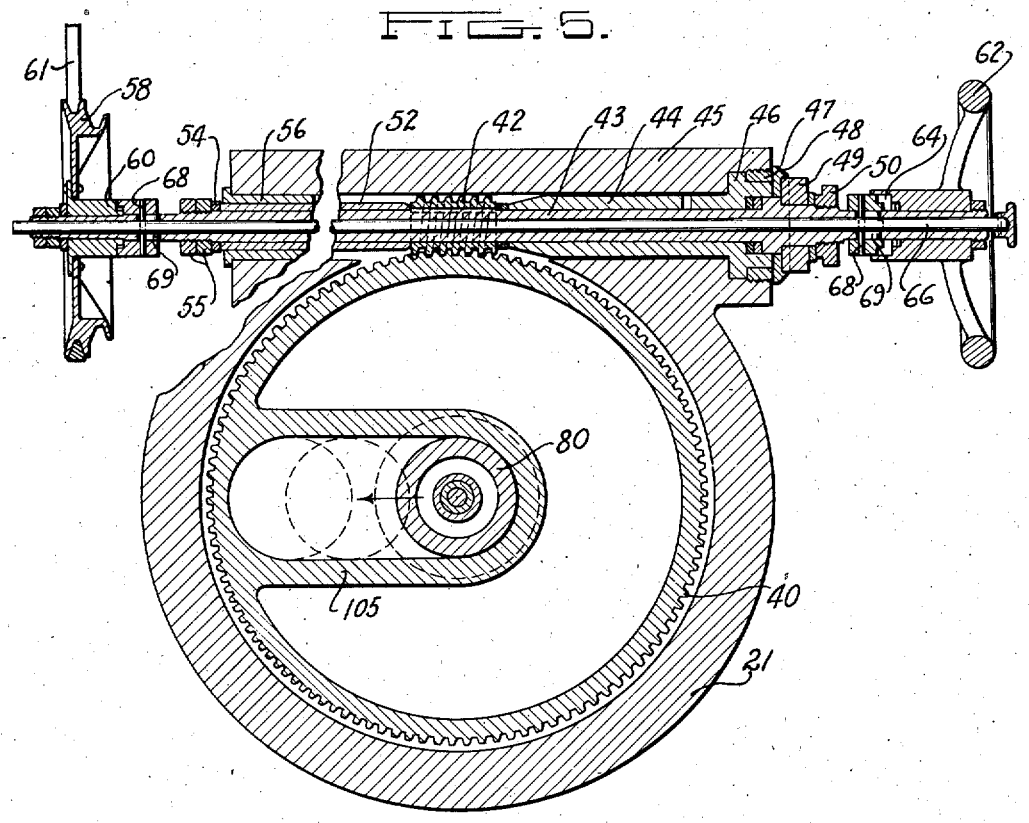
Fig. 5 is a section on line 5—5 of Fig. 4, with parts broken away.
Figure 6:
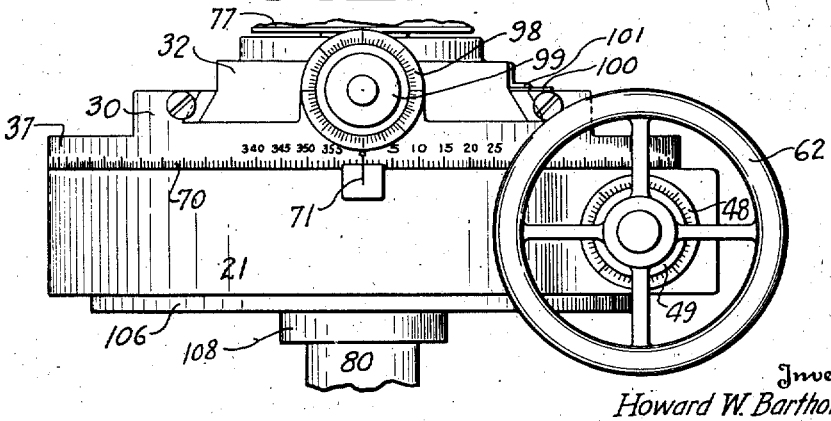
Fig. 6 is a fragmentary front elevation of the attachment.

Gear teeth 40 are cut in the periphery of the vertical part 36 of the head 30, so that the head may be turned relative to the frame 21. As shown in Fig. 5, rotation of the head is effected either manually or by a motor drive through the medium of a worm 42 keyed, or otherwise fixed, to a drive shaft 43 journaled at the forward end in a sleeve 44, which is received in the bore of a hollow frame extension 45. The sleeve 44 is shouldered adjacent its outer end, as at 46, and cooperates with an enlargement of the bore to prevent axial displacement of the worm 42 in a forward direction. An annular following ring 47 clamps the shoulder 46 against the frame extension. A vernier mechanism is fixed to the part of the drive shaft which extends beyond the outer end of the frame extension 45 and includes a stationary plate 48 fixed to the end of the sleeve 44, so as to be held against rotation. A circular scale 49 is suitably graduated and rotates with the drive shaft 43, being held thereon by a lock-nut and washer assembly 50.

At its rear end the drive shaft 43 is received in a sleeve 52. This sleeve abuts against the worm 42 at its inner end and at its outer end is engaged by a washer ring 54. Lock nuts 55 are threaded onto the drive shaft and force the washer 54 against the sleeve, and hence urge the latter against the worm 42 to take up any axial play which may be developed in the gear. The sleeve 52, which may turn with the shaft 43, is journaled in a suitable bushing 56 mounted in the rear end of the bore of the frame extension 45. The drive shaft 43 extends rearwardly of the frame and carries a drive pulley 58, the hub of which is enlarged to form part of a jaw clutch 60. A driving motor 59 is fixed to the bracing web 25 and is connected by an endless belt 61 to the pulley 58 so as to rotate the shaft 43 through the latter whenever the jaw clutch 60 is engaged. A hand wheel 62 is carried by the shaft 43 at its forward end and has its hub internally grooved to form part of a jaw clutch 64. The drive shaft 43 is made hollow throughout its length and receives a shift rod 66. The moving parts of both the jaw clutches 60 and 64 are fixed to the shift rod 66 by pins 68 which extend through suitable slots 69 in the drive shaft so as to provide for limited axial sliding movements of the clutch parts relative to the drive shaft. It will be seen that when the rod 66 is pushed inwardly, to the position shown in Fig. 5, the parts of the jaw clutch 60 are engaged so that the drive shaft 43 is driven through the pulley 58 by the motor 59. When the shift rod 66 is pulled outwardly, the clutch 60 becomes disengaged and the parts of the clutch 64 are moved into engagement, so that the rotation of the drive shaft is now accomplished through the medium of the hand wheel 62, the parts being positively connected by the cooperating members of the jaw clutch.

A scale 70 divided to read in degrees is provided around the exposed side of the flange 37 of the head 30. The divisions of the vernier scale 49 are in minutes and seconds so that it is possible to ascertain the exact angular position of the head at any time. A reference mark 71 is carried by the frame 21 to cooperate with the scale.

As shown in Fig. 4 the cutter assembly is supported by the rotatable head 30 through the medium of a cross slide 32 gibbed into the head so as to be movable diametrically thereof in a manner hereafter described. The cutter assembly embodies a vertical rotary cutter spindle 75, having provision at its lower end to receive conventional chuck parts 76 by which a suitable milling tool C may be releasably held. The cutter spindle 75 extends above the plane of the cross slide 32 and is there provided with a stepped drive pulley 77. Suitably spaced anti-friction bearings 78 and 79 support the spindle at points adjacent its upper and lower ends, the entire assembly being retained in a vertical spindle housing 80. The housing 80 is enlarged at its upper end in a flange 81 by which it is fixed to the cross slide 32 by screws 82. A hand wheel 83 is provided at the upper end of a threaded rod 84 which extends longitudinally through the cutter 75 to open or close the jaws of the chuck 76 in the lower end of the spindle to engage or release the shank of the milling tool C. While the rod 84 normally rotates with the spindle, it can be turned relative thereto to impart releasing or clamping movements to the chuck parts.

The cutter spindle 75 is driven by an endless belt 85 which engages the drive pulley 77 and extends therefrom to be trained over a pulley 86 fixed to the shaft of a suitable driving motor 87 carried by brackets 88 on the cross slide 32. The pulley 86 is stepped in a manner similar to the pulley 77 so that variations in the rotating speed of the cutter spindle are obtainable from a constant speed motor by shifting the drive belt 85. Obviously, the drive from the motor to the spindle may be accomplished in various ways.

Current may be supplied to the spindle driving motor 87 by any suitable means, such as a conventional brush and slip ring device 89.

Figure 2:
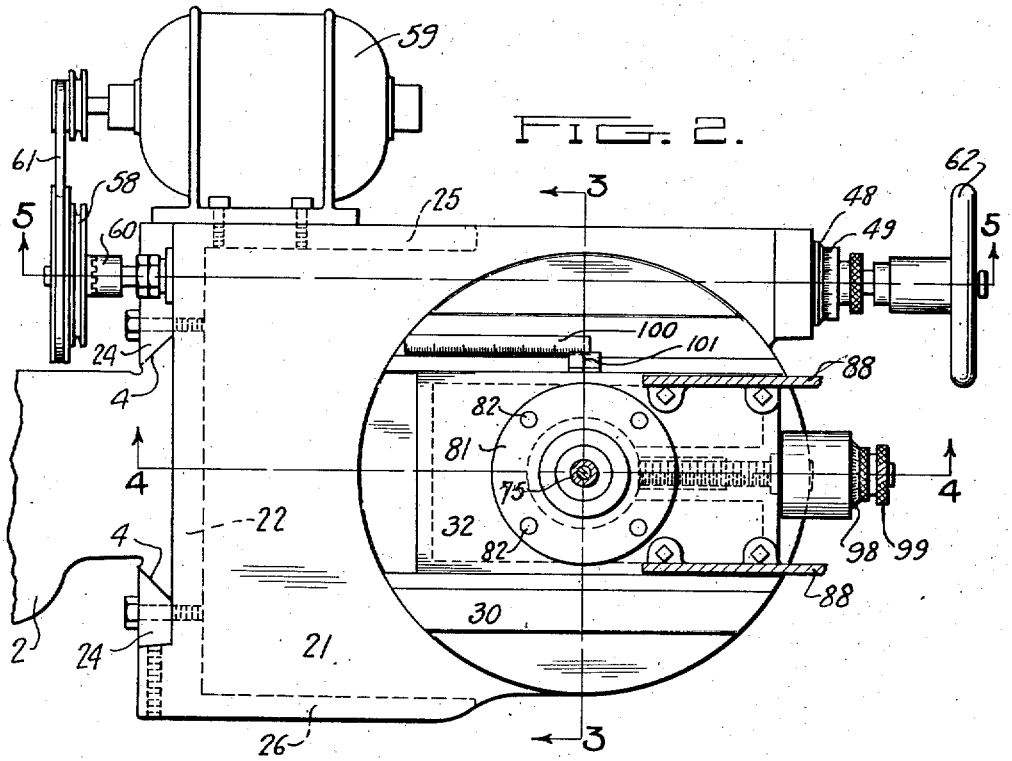
Fig. 2 is a fragmentary plan view, with parts in section, taken on a plane immediately overlying the body of the attachment.

The cross slide 32, and the parts carried thereby, namely the cutter assembly and drive, are movable diametrically of the rotatable head 30. As shown in Figs. 2 and 4, the mechanism used to impart movements to the slide includes a micrometer screw 90 working in a threaded tubular member 91 fixed in the cross slide at one end thereof. The screw 90 extends through a vertical extension 92 of the head 30 so that the reaction incident to movement of the cross slide by the screw is taken by the head. A shoulder 93 is formed on the screw and is held between a washer 94 on its inner side and an anti-friction thrust bearing 95 on its outer side. The washer is inserted between the shoulder and a cooperating head part while the thrust bearing 95 is brought snugly into position by an annular threaded follower ring 96 threaded into the bore of the head part. Thus, when the screw 90 is working to move the cross slide out from the center, the thrust is taken by the bearing 95 and the annular ring 96, while on a return of the slide, the force is transmitted through the washer 94 to the rotatable head.

A properly calibrated micrometer scale 98 is fixed to the screw 90 and is adapted to be read in conjunction with a reference mark impressed on the adjacent frame surface. A hand knob 99 is also fixed to the shaft to be grasped by the operator.

A "coarse" scale 100 (Fig. 2) is fixed to the rotating head adjacent the cross slide 32 and parallel to the gibbing by which the latter is guided. A reference mark 101 is carried on the slide. This scale is preferably graduated in tenths of an inch, while the vernier scale 98 is graduated in thousandths. It will thus be seen that the movement of the cross-slide relative to the rotating head may be accurately determined. When the reading of both scales 98 and 100 is zero, the axis of the cutter spindle, and hence the milling tool, exactly coincides with the center of rotation of the rotating head 30. Any movement of the slide, therefore, causes an eccentricity of the two centers, so that the center of the milling tool revolves about the central axis of the rotating head on a circular path, the radius of which is read on the scales 100 and 98, when the head 30 is rotated by the worm 42. This operation will be hereafter more fully explained.

As shown in Figs. 4 and 5, the head 30 is provided with a vertical, radially disposed guideway 105 in which the spindle housing 80 of the cutter assembly reciprocates. A ring 106 is secured to the under side of the rotatable head extension 36 and underlies the adjacent edge of the frame 21 to retain the head in position therein.

The spindle housing 80 is externally threaded, as at 107, at points where the housing emerges from the guideway 105. A clamping nut 108 is threaded onto the housing and is adapted to be forced against a washer 106a and the guideway 105 so as to support the housing and spindle assembly against vibration. When it is desired to move the tool to a new cutting position, the nut 108 is backed off, out of engagement with the plate. After the proper setting has been reached, the nut is again clamped to support the cutter assembly. It will thus be seen that the cutter spindle and its housing are held at two spaced points, by the clamping nut 108 and flange 81 by which the housing is fixed to the cross slide 32.

For purposes of illustration, the operation of the present invention will be described with reference to an arbitrary sample of work shown in Fig. 7. It will be assumed that it is desired to mill out the shaded area shown to a predetermined depth, leaving only the outline and an annular surface S surrounding a hole H cut entirely through the block. The block is first clamped to the table with the center lines X—X and Y—Y squared with the directions of movement of the cross feed and longitudinal feed with which the machine is regularly equipped. The intersection of the X axis, represented by the longitudinal feed, and the Y axis, represented by the cross feed, is then brought directly under the center of the cutter C, the latter having been previously made concentric with the rotating head 30, so that the readings of the scale 100 and its micrometer 98 are at 0. With the parts in this position, the indications on the scales associated with the respective cross and longitudinal feeds are taken and noted. In most instances, the scale of the longitudinal feed is graduated to increase from left to right and moves with the table 8 of the machine while the reference mark with which the scale is read is stationary. For the sake of simplicity, it is assumed that the longitudinal feed scale (and micrometer) reads 8.000 and the cross feed scale (and micrometer) reads 7.000. Assume also that the diameter of the cutter C is .250 inch.

If the work is to start in the lower right hand corner of the block, the block is moved to the left with relation to the cutter a distance on the X axis such that the outer edge of the cutter will be 4.750 inches from its original position, being the outer dimension given for this point. Thus, it is necessary to move the work under the center of the cutter 4.625 inches, or until the scale reading is 12.625. The cross feed is then actuated to move the block in toward the throat of the machine a distance 5.750 inches, the dimension given, minus one-half the diameter of the cutter, so that the cross feed scale reads 12.625. The cutter spindle is then started by starting the driving motor 87. By moving the block up against the cutter by actuation of the vertical feed hand crank 6, the cutting is begun and the vertical feed is continued until the desired depth of the cut has been reached as indicated on the micrometer scale associated with the vertical feed.

It will be seen that the first part of the cut is to be made parallel to the X axis and is to continue until a tangent with the circle in the lower left hand corner is reached. Thus, it is necessary to feed the work under the cutter, moving it to the right, until the center of the cutter is on a line with the given center of the circle. This latter center is given one inch to the left of the Y axis, so that the cut should continue one inch beyond this axis, making the total straight line cut 5.625 inches. This cut may be made by rotating the longitudinal-feed hand-wheel 12. At this point the advantage of the present invention becomes particularly apparent.

The arbitrary work shown calls for a circular cut 90° in extent on a three inch radius. It will be seen that it is desired to mill out all material on the inside of the radius so that the outside of the cutter must lie on a point three inches from the given center. In order to make this cut, the first operation is to lower the work from contact with the cutter, and by moving the cross and longitudinal feeds, center the work on a point 2.750 inches down on the Y axis and 1.000 inch to the left on the X axis being the dimensions given. Since the coordinates of the reference center of the block are 8.000 and 7.000 respectively, the scale readings will be 9.750 on the cross feed and 7.000 on the longitudinal feed. Having thus located the center, the cutter is moved so that it will cut on a three inch radius. This movement is accomplished by turning the screw 90 by means of the hand knob 99 to move the cross slide 32 out from the center of the rotating head until the desired radius is indicated on the scale 100 and its associated micrometer 98. As above noted, it is desired to mill out the material on the inside of this circle so that the reading on the scale 100 will be the given radius, minus one-half the diameter of the cutter (.125 inch) or 2.875 inches. When this has been done, the center of the cutter will overlie a point somewhat to the rear of the X axis in Fig. 7, but by turning the rotating head 30 through 180°, as indicated on the scale 70, the cutter will again overlie the part which has just been removed by the straight cut. The spindle 80 is then clamped against the plate 106 by the ring 108. The vertical feed is then used to move the work up to the cutter and the cutter driving motor 87 is again started. The work is permitted to remain stationary and the rotating head 30 is turned through an arc of 90° in a clockwise direction. Since the starting point was indicated by 180° on the scale 70, the rotation will continue until the scale reading is 270° on the same scale. With the cutter in this position, the three inch circle will have been completed.

As soon as the 90° circular cut has been completed, the layout given in Fig. 7 calls for a cut made on an angle of 46° with the X axis. To make this cut the work is lowered from the spindle which is released from its clamped position and retracted to the center of the head, a distance of 2.875 inches, and the table is moved a like distance to follow it. The rotating head is then swung around until the cross slide 32 lies on an angle of 46° from the X axis, which will be indicated by a reading of 46° on the scale 70. With the parts in this position the spindle may be again lowered into engagement with the work and its rotation started. The cut will be made by rotating the cross slide feed screw 90, which serves to push the cross slide, and consequently the spindle, along a line disposed at an angle of 46°, as called for in the diagram. This cut may be continued well beyond the dimension given of 2.600 inches, inasmuch as the cutter will be working in an area which is to be entirely milled out. However, it is preferable to continue the cut only until the rear edge of the cutter has reached the dimension, which will be indicated on the scale 100 and its micrometer 98 by a reading of 2.725, being the straight line dimension plus one-half the diameter of the cutter.

If the operator next wishes to cut the hole H and leave the annular surface S, this may be done by lowering the work out of engagement with the tool, and moving it until the given center lies directly under the center of the rotating head 30. Thus, the scale on the longitudinal feed will read 7.250 (being the initial reading minus the X dimension) and the scale in the cross feed will read 5.875 (the initial reading minus the Y dimension). To cut the hole H, the operator will set the cross slide 32 to the radius of the hole minus one-half the diameter of the cutter. Since the hole has a one-half inch radius, the reading on the scale 100 and its micrometer will be .375. The work is then brought into contact with the cutter which has been started, and the rotating head 30 is also started by starting its driving motor 59, and engaging the jaw clutch 60 by moving the shift rod 66. Thus, the head is now being rotated by the driving motor 59, and the spindle is being rotated by its driving motor 87. The spindle, however, is now revolving about the center of the rotating head with the outside of the cutter following a point one-half inch removed from this center. This motion is continued, while the operator moves the vertical feed as the cut progresses until the hole is completely bored through the block, as called for in the layout. It will thus be seen that the present invention enables the operator to cut a hole of any given diameter up to the capacity of the machine without changing the size of the cutter used, and without regard to the location of the center of the hole.

After the hole has been completed, the table is in position to cut around the annular surface S. The work is then lowered away from the cutter which is adjusted to cut on the outside of a circle having a one inch radius, being the radius of the hole plus the radial dimension given for the annular surface S. It will thus be necessary to move the center of the cutter to a point one inch from the center of the rotating head plus one-half the diameter of the cutter, or 1.125 inches, as indicated on the scale 100 and its associated micrometer. The work is then again brought into contact with the cutter and both the cutter driving motor 87 and the head driving motor 59 are started, so as to rotate the cutter and at the same time rotate the head 30. It will be seen that the cutter is again describing a circle about the center of the rotating head, the radius of the circle being indicated on the scale 100. This cut is continued until the block has been milled to the desired depth, the operator feeding the work against the cutter by actuation of the vertical feed.

The next cut to be made is the three inch corner radius in the upper left hand corner of the layout. Again the operator moves the work with relation to the center of the rotating head to the given dimensions, so that the indication on the longitudinal feed scale is 6.500 (the initial reading minus the X dimension given), and the reading on the cross feed scale is 4.500. The spindle is again set for an inside cut on a three inch radius, so that the reading on the scale 100 is the radial dimension of the cut minus one-half the diameter of the cutter, or 2.875 inches. It will be seen from the diagram that the cut is to extend 90° so that after the spindle has been moved and clamped in the proper radial position, the rotating head 30 may be moved by the hand-wheel until the angular reading on the scale 70 indicates 0°. At this point, the cutter will be in a position to operate on the farthest extremity of the radius, so that it will be swung in a counterclockwise direction on the layout to make the desired cut. The operator may then start the spindle and, by moving the vertical feed, cut to the desired depth. The circular cut will best be made by moving the head 30 by means of the hand-wheel 62, so that the shift rod 66 will be pulled out to disengage the clutch 60 and engage the clutch 64. By turning the hand-wheel 62 so that it will rotate the head 30 in a counterclockwise direction, the cut will be continued until the reading of the scale 70 and its associated micrometer is 270°. The rotation of the head 30 may now be stopped since the circular cut is finished, but the rotation of the cutter will be continued since the next cut is a straight line tangent to the corner circle and 1.250 inches in extent. The cross feed is then rotated to move the block under the cutter in towards the throat of the machine a distance of 1.125 inches (the dimension minus one-half the diameter of the cutter), or until the reading of the cross feed scale is 5.625. It should be here noted that the straight line cut will be exactly tangent to the circular corner cut.

The square cornered cut indicated in the center left hand part of the diaphragm is made by rotating longitudinal feed so as to move the block under the cutter to the left until the back of the cutter reaches the indicated dimensional distance of 2.125 inches on the X axis. The longitudinal feed scale will now read 6.000, being the dimension given for the end of the line plus one-half the diameter of the cutter. By moving the cross feed to force the block under the cutter towards the throat of the machine, the vertical straight line indicated on the layout may be cut and will be continued until the line has intersected with the 46° line previously cut.

It will be noted that the cutter is still clamped in the position which was used to cut the three inch radius in the upper left hand corner, so that the operator will return the block to the point at which this radius was cut and by moving the rotating head until the scale 70 indicates 0° will be in a position to make the straight line cut across the top of the block. This cut is made in the usual manner by moving the longitudinal feed to move the block under the cutter. When the block has been moved a distance indicated by the dimension minus one-half the diameter of the cutter, the latter will be at the extreme upper right of the block and the longitudinal feed scale will read 12.625. At this time the straight line portion of the right hand side of the block may be cut by moving the block under the cutter a distance of 1.480 inches minus the full diameter of the cutter since the dimensions of the cut are the extremities of the effectual travel of the tool. The cross feed scale will now indicate 2.855 and the parts are in position to make the circular cut indicated at the top right of the diagram. It will be noted that the center of this cut lies two inches above the X axis and 5.875 inches to the right of the Y axis, bringing it outside of the block. It will also be noted that this cut is 135° in extent. The operator moves the longitudinal and cross feeds until the indicated center lies directly under the center of the rotating head 30. The longitudinal feed scale will read 13.875, the initial reading plus the given dimension, and the cross feed scale will read 5.000, the initial reading minus the given dimension. The clamp 108 is backed off and the cross slide 32 moved until the scale 100, 98 indicates that the center of the cutter lies out from the center of the rotating head 30, the radial distance plus one-half the diameter of the cutter or 2.585 inches. The cut is to be started at an angle of 26° in a counterclockwise direction from the Y axis, so that the reading on the scale 100 at the beginning of the cut will be 26°. The cut is then continued in a counterclockwise direction 135° so that the indication on the scale 70 is 161°. With the housing 80 still clamped in the same position the small vertical cut of .625 inch may be made by moving the cross feed the dimensional distance minus the diameter of the cutter or .475 inch.

The last circular cut is made by moving the cross slides until the indicated center lies under the center of the rotating head 30. The dimensions of the center are 4.750 inches on the axis and 3.125 inches on the Y axis, so that the longitudinal feed scale reads 12.750 and the cross feed scale reads 10.125. The cross slide 32 and the spindle housing are moved until the cutter occupies the proper position with relation to the head 30, so that its center is removed from the center of the rotating head the radial distance plus one-half the diameter of the cutter or 2.000 inches as indicated on the scale 100 and its associated micrometer. The cut is to be started at a point which will be indicated at 0° on the scale 70 since this point is directly above the given center, and is to be continued 180°. With the scale 70 at 0° and the parts clamped in the proper position, rotation of the head 30 may be started and continued in a counterclockwise direction until the scale 70 and its micrometer 49 indicates 180°. This completes the circular cut, and the outline of the block is then completed by moving the cross feed so as to move the block in towards the throat of the machine under the cutter until the last straight line cut intersects the initial cut.

To summarize the operation, all straight line cuts parallel to either of the given axes are made by moving the cross and longitudinal feeds with which the machine is regularly equipped. All circular cuts are made by moving the cross and longitudinal feeds until the indicated center lies directly under the center of the rotating head 30. With the parts in this position, the cross slide 32 is moved out from the center of the rotating head 30 the radial distance indicated on the layout, plus or minus one-half the diameter of the cutter depending on whether an inside or outside cut is to be made. Thus, when the head is rotated, the cutter will revolve about the indicated center of the cut on the designated radius. Angular cuts may be made by feeding the cross slide relative to the head 30 without moving the latter except to position the parts to start the cut.

Obviously, numerous modifications and changes may be made in the mechanisms comprising the cutter spindle and its associated parts, and various changes may be made in the devices used to accomplish the several movements. It should be expressly understood that the present invention comprehends such modifications and changes as may fall within the scope of the appended claims.

I claim:

1. In a milling machine, a frame, a vertically adjustable work table carried thereby, means to move the table laterally in different directions with respect to the frame, a rotatable cutter spindle, driving means to rotate the same, independently rotatable supporting means for rotatably carrying the spindle, means to mount the rotatable supporting means on the frame in operative relation to the table, means to actuate the spindle supporting means, means to move the cutter spindle radially of the rotatable supporting means to effect varying cutting positions thereof relative to the work supporting table, and releasable means carried by the spindle intermediate its ends and engaging a portion of the rotatable supporting means to retain the spindle in its radially adjusted position relative to the supporting means.

2. In a milling machine, a frame, a vertically adjustable work table carried thereby, means to move the table laterally in different directions with respect to the frame, a rotatable cutter spindle, driving means to rotate the same, independently rotatable supporting means for rotatably carrying the spindle, means to mount the rotatable supporting means on the frame in operative relation to the table, means to move the cutter spindle radially of the supporting means independently of the latter to effect varying cutting positions of the spindle relative to the work supporting table, and means to actuate the spindle supporing means, whereby to move the rotating cutter spindle in a path circumferentially of an axis of the work carried by said work table.

3. In a milling machine, a frame, a vertically adjustable work table carried thereby, means to move the table laterally in different directions with respect to the frame, a rotatable cutter spindle, driving means to rotate the same, independently rotatable supporting means rotatably carrying the spindle and having a radially extending trackway in which said spindle is adapted to move, means carried by the spindle and engageable with said trackway to retain the spindle in varying cutting positions, means to mount said rotatable supporting means on the frame in operative relation to the table, and means to actuate the rotatable spindle supporting means, whereby to move the rotating cutter spindle in a path circumferentially of an axis of the work carried by said work table.

4. In a milling machine, a frame, a vertically adjustable work table carried thereby, means to move the table laterally in different directions with respect to the frame, a rotatable cutter spindle, driving means to rotate the same, vertically adjustable independently rotatable means to rotatably support the cutter spindle from the frame in operative relation to the table, means to move the cutter spindle radially of the supporting means, and means to rotate the supporting means, whereby to move the rotating cutter spindle in a path circumferentially of an axis of the work carried by said work table.

5. In a milling machine, a frame, an adjustable work table carried thereby, means to move the table in different directions with respect to the frame, a rotatable cutter spindle, a driving motor to rotate the same, rotatable supporting means for carrying the spindle and driving motor, means to mount the rotatable means on the frame in operative relation to the table, means to relatively move the spindle and table in the direction of the axis of the spindle, means to move the cutter spindle and motor radially of the supporting means independently of the latter to effect varying cutting positions of the spindle relative to the work supporting table, and means to actuate the spindle supporting means whereby to move the rotating cutter spindle in a path circumferentially of an axis of the work carried by the work table.

6. In a milling machine, a frame, a vertically adjustable work table carried thereby, means to move the table laterally in different directions with respect to the frame, a rotatable cutter spindle support movably mounted on the frame, a rotatable cutter spindle, a driving motor to rotate the same, a milling cutter mounted on said spindle, means for slidably mounting the rotatable spindle and the driving motor upon said support for lateral adjustment with respect thereto, and means for rotating said spindle support whereby to move the rotating cutter in a path circumferentially of an axis of the work carried by said work table.

7. In a milling machine, a frame, a work-table carried thereby, means to move the table laterally in different directions with respect to the frame, scales for measuring the movement of the table in each direction, a rotatable cutter spindle, driving means to rotate the same, independently fully rotatable support means for the spindle, means to mount the rotatable support means on the frame, means to relatively move the table and spindle in the direction of the axis of the spindle, a scale for measuring the said movement, means to rotate the spindle support means, a scale for measuring the rotation of the spindle support means, means to move the cutter spindle radially of the support means, a scale for measuring the radial displacement of the cutter spindle, and releasable means carried by the spindle intermediate its ends and engaging a portion of the rotatable support means to retain the spindle in its radially adjusted position relative to the support means.

8. In a milling machine, a frame, a work-table carried thereby, means to move the table laterally in different directions with respect to the frame, scales to measure the movement in each direction, a rotatable cutter spindle, driving means to rotate the same, independently fully rotatable support means for the spindle, means to mount the rotatable support means on the frame, means to relatively move the table and spindle in the direction of the axis of the spindle, a scale for measuring the said movement, means to move the cutter spindle radially of the support means, a scale to measure the radial movement, means to rotate the spindle support means whereby to move the rotating cutter spindle in a circumferential path, and a scale to measure the angular movement of the spindle support means.

9. In a milling machine, a frame, a work-table carried thereby, means to move the table laterally in different directions with respect to the frame, distance measuring apparatus to measure the movement of the table in each direction, a rotatable cutter spindle, driving means to rotate the same, means to relatively move the cutter spindle and table in the direction of the axis of the spindle, distance measuring apparatus to measure the said movement, fully rotatable support means for the spindle having a radially extending trackway in which said spindle is adapted to move, distance measuring apparatus to measure the radial movement of the spindle, means carried by the spindle and engageable with said trackway to retain the spindle in varying cutting positions, means to mount said rotatable support means on the frame, means to rotate the rotatable support means whereby to move the rotating cutter in a circumferential path, and a measuring apparatus to measure the angular movement of the spindle support means.

10. In a milling machine, a frame, a work-table carried thereby, screw means to move the table laterally in different directions with respect to the frame, micrometer scale means for measuring the movement of the table in each direction, a rotatable cutter spindle, driving means to rotate the same, independently fully rotatable means to support the cutter spindle from the frame, screw means affording relative movement of the cutter spindle and table in the direction of the axis of the spindle, micrometer scale means to measure the said movement, screw means to move the cutter spindle radially of the support means, micrometer scale means to measure the radial movement, screw means to rotate the support means whereby to move the rotating cutter spindle in a circumferential path, and micrometer scale means to measure the angular movement of the support means.

11. In a milling machine, a frame, a work-table carried thereby, a rotatable cutter spindle, driving means to rotate the same, cut control means to relatively move the spindle and the table in three different mutually perpendicular directions, micrometer scale means to measure the relative movement of the spindle and table in each of said three directions, fully rotatable support means for the spindle, means to mount the rotatable means on the frame, means to move the cutter spindle radially of the support means, a scale to measure the radial movement, means to rotate the spindle support means whereby to move the rotating cutter spindle in a circumferential path, and a scale to measure the angular movement of the spindle support means.

12. In a milling machine, a frame, a work-table carried thereby, a rotatable cutter spindle, driving means to rotate the same, screw means to relatively move the support and the table in three different mutually perpendicular directions, fully rotatable support means for the spindle, means to mount the same on the frame, means for slidably mounting the cutter spindle upon said support for lateral adjustment with respect thereto, micrometer scale means for measuring the lateral movement, means for rotating said spindle support whereby to move the rotating cutter spindle in a circumferential path, and a scale for measuring the angular movement of the spindle support means.

13. In a milling machine, a frame, a work-table carried thereby, a rotatable cutter spindle, driving means to rotate the same, a cutter spindle support movably mounted on the frame, means to relatively move the table and support in three different coordinate directions, distance measuring apparatus to measure the relative movement of the table and support in each of said directions, means for slidably mounting the spindle upon said support for lateral adjustment with respect thereto, distance measuring apparatus for measuring the lateral movement, means affording full rotation of said spindle support whereby to move the rotating cutter spindle in a circumferential path, and measuring apparatus for measuring the angular movement of the spindle support.

14. In a milling machine adapted to form cylindrical surfaces and angularly disposed linear surfaces in predetermined position and relationship on a workpiece, the combination with a frame, of a spindle carrying head journaled in said frame for full rotation relative thereto, a spindle housing slidably carried by said head for adjustment radially thereof, a cutter supporting spindle journaled in said housing for rotation upon an axis parallel with the axis of rotation of said head, driving means to rotate said spindle, means to continuously rotate said head to move said rotating spindle in a circular cutting path of radius determined by the radial position of said housing in said head, means to move said spindle housing radially of said head to adjust the radial position thereof or to effect a linear cutting action along a path of direction determined by the angular position of said head, a work supporting table disposed on said frame in position to present a workpiece in cooperative relationship with a cutter carried by said spindle, means to effect relative adjustment of said table and said spindle in the direction parallel with the axis of said spindle to regulate the depth of cut in a workpiece, and means to effect relative adjustment of said table and said spindle along linear paths in a plane transverse to the axis of said spindle to position a workpiece relative to said spindle for a subsequent circular or angular cutting action or to effect on said workpiece a linear cutting action along a path having a predetermined fixed relationship to said workpiece.

15. In a milling machine adapted to form cylindrical surfaces and angularly disposed linear surfaces in predetermined position and relationship on a workpiece, the combination with a frame, of a spindle carrying head journaled in said frame for full rotation relative thereto, a spindle housing slidably carried by said head for adjustment radially thereof, a cutter supporting spindle journaled in said housing for rotation upon an axis parallel with the axis of rotation of said head, driving means to rotate said spindle, means to continuously rotate said head to move said spindle in a circular cutting path of radius determined by the radial position of said housing said head, a scale to measure the angular movement of the head, means to move said spindle housing radially of said head to adjust the radial position thereof or to effect a linear cutting action along a path of direction determined by the angular position of said head, a scale to accurately measure said radial movement, a work supporting table disposed on said frame in position to present a workpiece in cooperative relationship with a cutter carried by said spindle, means to effect relative adjustment of said table and said spindle in the direction parallel with the axis of said spindle to regulate the depth of cut in a workpiece, and means to effect relative adjustment of said table and said spindle along linear paths in a plane transverse to the axis of said spindle to position a workpiece relative to said spindle for a subsequent circular or angular cutting action or to effect on said workpiece a linear cutting action along a path having a predetermined fixed relationship to said workpiece.

16. An accessory for a milling machine of conventional type, said accessory comprising a cutter spindle, a driving motor to rotate the same, fully rotatable support means carrying the cutter spindle and motor, precision screw and scale means to move the cutter spindle and motor radially of the rotatable support means by a desired amount, manual means and motor-driven means to rotate the support means in order to move the rotating cutter spindle in a circumferential path, precision scale means to measure the angular movement of the support means, means whereby either said manual means or motor means may be used, and means adapting said accessory to be mounted on the main frame of a conventional milling machine in operative relationship to the table of said milling machine.

17. An accessory for adapting a milling machine to form cylindrical surfaces and angularly disposed linear surfaces in predetermined position and relationship on a workpiece, said accessory comprising a frame, a spindle-carrying head journalled in said frame for full rotation relative thereto, a spindle housing slidably carried by said head for adjustment radially thereof, a cutter supporting spindle journalled in said housing for rotation upon an axis parallel with the axis of rotation of said head, driving means to rotate said spindle, means to continuously rotate said head to move said spindle in a circular cutting path of radius determined by the radial position of said housing in said head, a scale to measure the angular movement of the head, means to move said spindle housing radially of said head to adjust the radial position thereof or to effect a linear cutting action along a path of direction determined by the angular position of said head, a scale to accurately measure said radial movement, and means whereby said frame may be mounted on the main frame of a conventional milling machine in operative relationship to the table of said milling machine.

HOWARD W. BARTHOLOMEW.